(12) United States Patent
Chun et al.

(10) Patent No.: US 11,289,047 B2
(45) Date of Patent: Mar. 29, 2022

(54) DISPLAY DEVICE INCLUDING IMAGE CORRECTOR

(71) Applicant: Samsung Display Co., Ltd., Yongin-si (KR)

(72) Inventors: Byung Ki Chun, Yongin-si (KR); Soon Dong Kim, Yongin-si (KR); Hae Kwan Seo, Yongin-si (KR); Seung Jae Lee, Yongin-si (KR); Jun Gyu Lee, Yongin-si (KR); Bong Ju Jun, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/831,033

(22) Filed: Mar. 26, 2020

(65) Prior Publication Data

US 2021/0035524 A1 Feb. 4, 2021

(30) Foreign Application Priority Data

Jul. 29, 2019 (KR) .................. 10-2019-0091941

(51) Int. Cl.
*G09G 5/00* (2006.01)
*G06T 3/40* (2006.01)

(52) U.S. Cl.
CPC .............. *G09G 5/003* (2013.01); *G06T 3/40* (2013.01); *G09G 2340/0435* (2013.01)

(58) Field of Classification Search
None
See application file for complete search history.

(56) References Cited

U.S. PATENT DOCUMENTS

| | | | | |
|---|---|---|---|---|
| 5,345,250 A | * | 9/1994 | Inoue | G09G 3/3629 345/100 |
| 9,489,882 B2 | * | 11/2016 | Kim | H01L 27/1251 |
| 10,079,000 B2 | * | 9/2018 | Zheng | G06F 3/04847 |
| 10,163,380 B2 | | 12/2018 | Chun et al. | |
| 2004/0252135 A1 | * | 12/2004 | Ono | G09G 5/02 345/619 |
| 2007/0171311 A1 | * | 7/2007 | Chan | G09G 3/007 348/701 |
| 2010/0026722 A1 | * | 2/2010 | Kondo | H04N 21/440281 345/660 |
| 2016/0093239 A1 | * | 3/2016 | Wang | G06F 1/32 345/55 |
| 2016/0239171 A1 | * | 8/2016 | Anai | G06F 40/143 |
| 2016/0274690 A1 | * | 9/2016 | Tripathi | G06T 19/006 |
| 2018/0286356 A1 | * | 10/2018 | Jiang | G09G 5/36 |
| 2019/0012961 A1 | | 1/2019 | Kim et al. | |

(Continued)

FOREIGN PATENT DOCUMENTS

KR 10-2016-0132170 A 11/2016
KR 10-2019-0004864 A 1/2019

(Continued)

*Primary Examiner* — Edward Martello
(74) *Attorney, Agent, or Firm* — Lewis Roca Rothgerber Christie LLP

(57) ABSTRACT

A display device includes: a frame data counter configured to calculate frame information of an image displayed in a display area; a speed controller configured to determine a moving speed of the image; and a scenario determiner configured to determine a moving direction and moving amount of the image.

17 Claims, 13 Drawing Sheets

(56) References Cited

U.S. PATENT DOCUMENTS

| | | |
|---|---|---|
| 2019/0088194 A1 | 3/2019 | Chun et al. |
| 2020/0372875 A1* | 11/2020 | Iyer ..................... G06F 1/1677 |
| 2021/0027697 A1 | 1/2021 | Yoon et al. |
| 2021/0027700 A1 | 1/2021 | Chun et al. |

FOREIGN PATENT DOCUMENTS

| | | |
|---|---|---|
| KR | 10-2019-0032709 A | 3/2019 |
| KR | 10-2021-0013485 A | 2/2021 |
| KR | 10-2021-0013505 A | 2/2021 |

\* cited by examiner

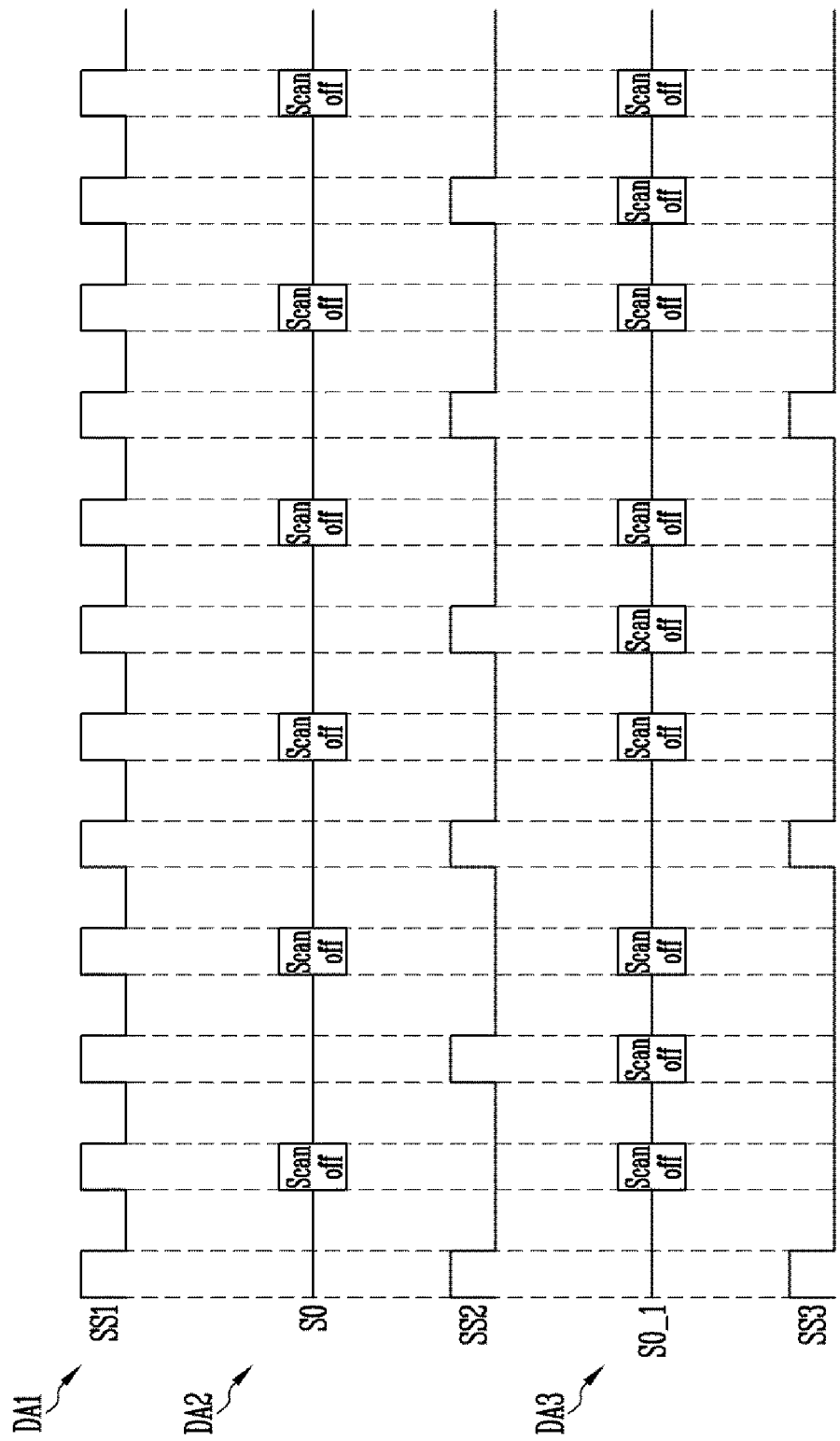

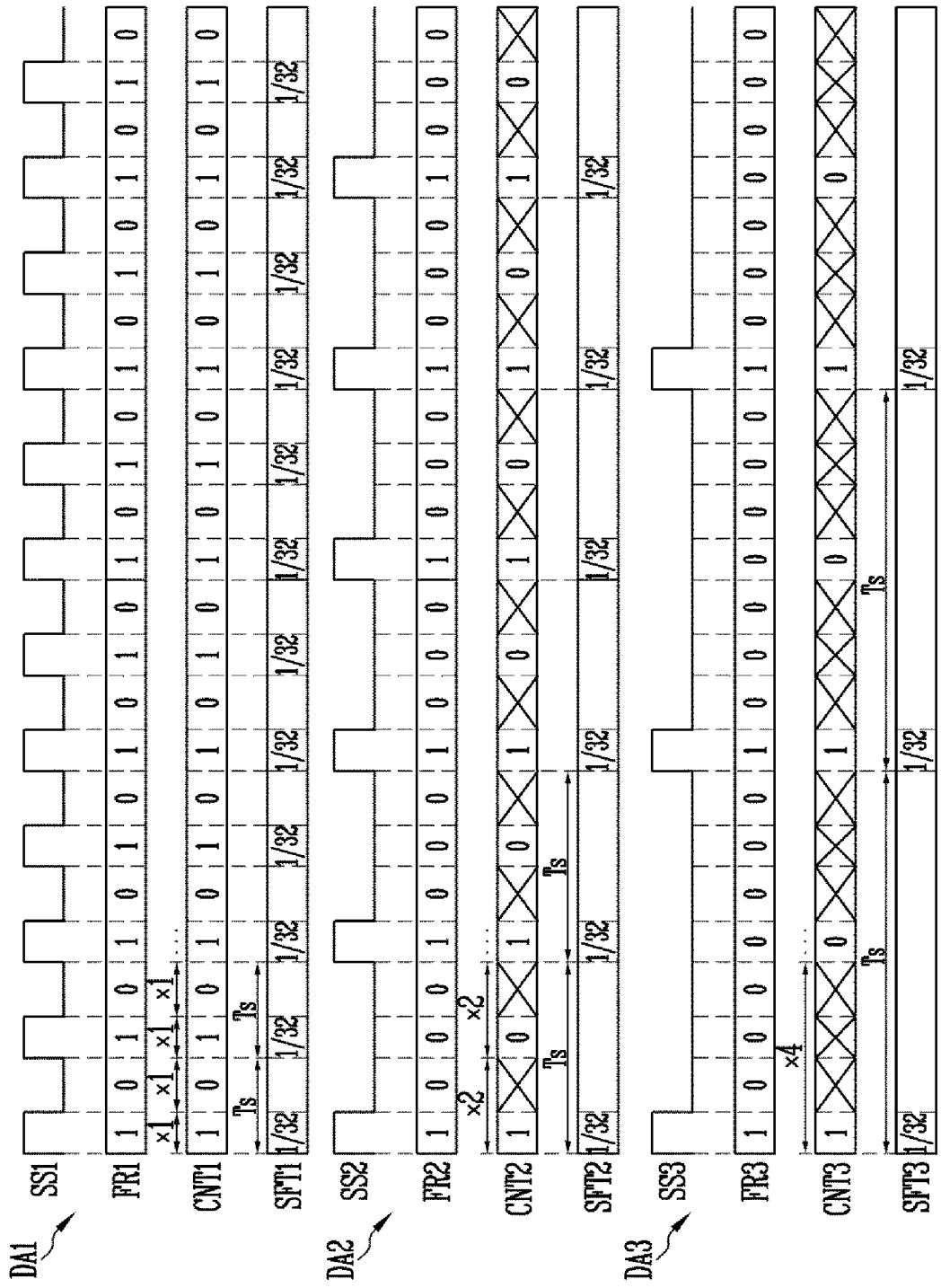

DISPLAY DEVICE INCLUDING IMAGE CORRECTOR

CROSS-REFERENCE TO RELATED APPLICATION

The present application claims priority to and the benefit of Korean Patent Application No. 10-2019-0091941 filed in the Korean Intellectual Property Office on Jul. 29, 2019, the entire contents of which are incorporated herein by reference.

BACKGROUND

1. Field

Aspects of some example embodiments of the present invention relate to a display device including an image corrector.

2. Description of the Related Art

Recently, various kinds of display devices such as organic light emitting display devices, liquid crystal display devices, plasma display devices, and the like are widely used.

Because such display devices may continuously output a specific or fixed image or text for a long period of time, pixels where the image or text is displayed may degrade and cause performance degradation.

In order to reduce the above-described problem, a technique (so-called pixel shift technique) of moving and displaying an image on a display panel according to a set or predetermined period may be used. When moving and displaying an image on a display panel according to a set predetermined period, it may be possible to prevent or reduce a degradation of a specific pixel by preventing or reducing output of the same data to the specific pixel for a long period of time.

Additionally, power consumption of a display device may be reduced by variously changing a driving method of the display device. As one of driving methods for reducing the power consumption, a low speed driving method that reduces a frequency for driving the display device to be smaller than a basic driving frequency may be utilized. As another driving method, a method that divides a display device into a plurality of areas and drives the area at different frequencies may be utilized.

The above information disclosed in this Background section is only for enhancement of understanding of the background and therefore the information discussed in this Background section does not necessarily constitute prior art.

SUMMARY

Aspects of some example embodiments of the present invention relate to a display device including an image corrector, and for example, to an image corrector for providing a function moving an image and a display device for moving and displaying the image.

Some example embodiments of the present invention include a display device in which an image moves in the same manner in a plurality of display areas driven at different frequencies.

The characteristics of the present invention are not limited to the characteristics mentioned above, and other technical characteristics that are not mentioned may be clearly understood to a person of an ordinary skill in the art using the following description.

An image corrector according to some example embodiments of the present invention includes a frame data counter that calculates frame information of an image provided in a display area; a speed controller that determines a moving speed of the image; and a scenario determiner that determines a moving direction and moving amount of the image.

According to some example embodiments, the display area may include a first display area for driving the image with a first scan signal of a first frequency; and a second display area for driving the image with a second scan signal of a second frequency lower than the first frequency.

According to some example embodiments, the first frequency may be 1 Hz to 30 Hz, and the second frequency may be 60 Hz to 250 Hz.

According to some example embodiments, the second scan signal may be generated by applying a scan-off signal that turns off a scan-on signal of a specific frame from a signal of the first frequency.

According to some example embodiments, the scan-off signal may be generated by scan-off frame information and scan-off frequency information, and the frame data counter may receive the scan-off frame information, the scan-off frequency information, and a vertical synchronization signal from a processor.

According to some example embodiments, the image corrector may further include a scan-off position controller that determines a moving direction and a moving amount of a scan-off signal according to the moving direction and the moving amount of the image.

According to some example embodiments, the speed controller may determine by counting a frame of an image displayed in the first display area and counting a frame of an image displayed in the second display area.

According to some example embodiments, a speed that counts the frame of the image displayed in the second display area may be determined by 'a frame speed of the image displayed in the first display area×(the first frequency/the second frequency)'.

According to some example embodiments, the display area may further include a third display area for driving the image with a third scan signal of a third frequency lower than the second frequency, and a speed that counts a frame of an image displayed in the third display area may be determined by 'a frame speed of the image displayed in the first display area×(the first frequency/the third frequency)'.

According to some example embodiments, the moving speed of the image in the first display area may be the same as the moving speed of the image in the second display area.

According to some example embodiments, the image corrector may further include an up-down scaling adjuster that divides the image into a plurality of areas, determines a first area of the plurality of areas as a reduced area, and determines a second area of the plurality of areas as an extended area according to the moving direction.

According to some example embodiments, the up-down scaling adjuster may downscale the image in the first area, and upscale the image in the second area.

A display device in which a display area is defined and an image moves in the display area, according to some example embodiments of the present invention, includes: a display panel that includes a plurality of pixels; a driver that includes a timing controller controlling the display panel; and an image corrector that provides image data to the timing controller, and wherein the image corrector determines a moving speed, a moving direction, and a moving amount of the image.

According to some example embodiments, the plurality of pixels may include a first pixel and a second pixel adjacent to each other, and the image corrector may move the image by reducing in a frame unit by a certain ratio of a light emitting amount of the first pixel and increasing in a frame unit by the certain ratio of a light emitting amount of the second pixel.

According to some example embodiments, the certain ratio may be 1/32 of a light emitting amount of a previous frame.

According to some example embodiments, the display area may include a first display area driving the image with a first scan signal of a first frequency and a second display area driving the image with a second scan signal of a second frequency lower than the first frequency, and a speed at which the image moves in the first display area may be the same as a speed at which the image moves in the second display area.

According to some example embodiments, the display device may bend with respect to a bending axis.

According to some example embodiments, the bending axis may cross the display area, and the first display area and the second display area may be divided by the bending axis.

According to some example embodiments, the moving speed may be calculated by counting a frame of an image displayed in the display area, the display area may include a plurality of areas driven at different frequencies, the moving speed may be calculated by counting a frame of an image displayed in the areas, and a speed that counts a frame of an image of each of the areas may be different from each other.

According to some example embodiments, a speed that counts the frame in a target area of the plurality of areas is determined by 'a frame counting speed in an area driven at a highest frequency×(a drive frequency in a display area driven at a highest frequency/a drive frequency in a target display area)'.

Particularities of other embodiments are included in the detailed description and drawings.

According to some example embodiments of the present invention, a display device an image moves in the same speed in a plurality of display areas driven at different frequencies.

Accordingly, a display device can reduce power consumption and minimize a visual degradation of pixel.

Effects of example embodiments of the present invention are not limited by what is illustrated in the above, and more various effects are included in the present specification.

BRIEF DESCRIPTION OF THE DRAWINGS

FIG. 13 is a drawing showing a concept of converting a high-frequency signal to a low-frequency signal in a display device of FIG. 12.

FIG. 14 is a drawing showing a concept of a speed control for image movements of display areas driven at different frequencies in a display device of FIG. 12.

DETAILED DESCRIPTION

Figure 1:
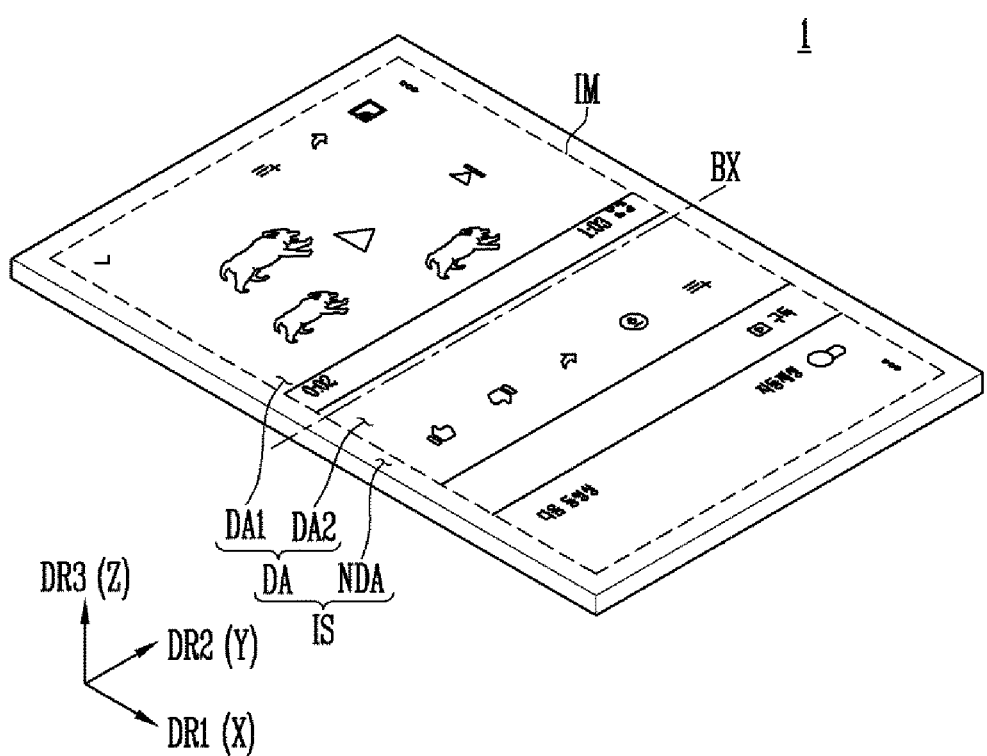
FIG. 1 is a perspective view of a display device according to some example embodiments of the present invention.

Aspects and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

Although the terms "first", "second", and the like are used to describe various constituent elements, these constituent elements are not limited by these terms. These terms are used only to distinguish one constituent element from another constituent element. Therefore, the first constituent elements described below may be the second constituent elements within the technical spirit of the present invention. When explaining the singular, unless explicitly described to the contrary, it may be interpreted as the plural meaning.

In the present specification, the term 'same' may be used not only when actual comparison objects is the exact same without errors, but also when the actual comparison objects is similar within 5% of an error range to be regarded as the same.

Hereinafter, referring to the accompanying drawings, aspects of some example embodiments of the present disclosure will be described in further detail. The same or similar reference numerals are used for the same constituent elements on the drawing.

Figure 2:
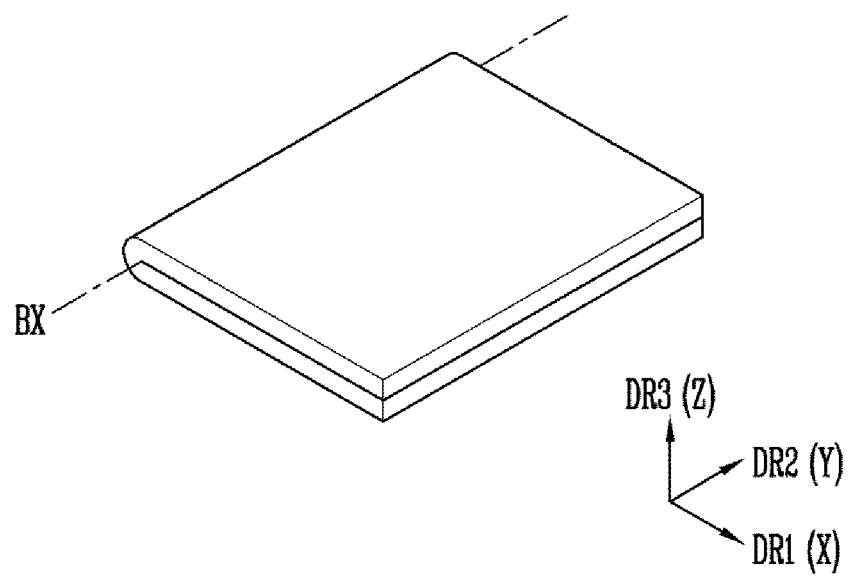
FIGS. 2 and 3 are perspective views showing a folded state of a display device of FIG. 1.
Figure 3:
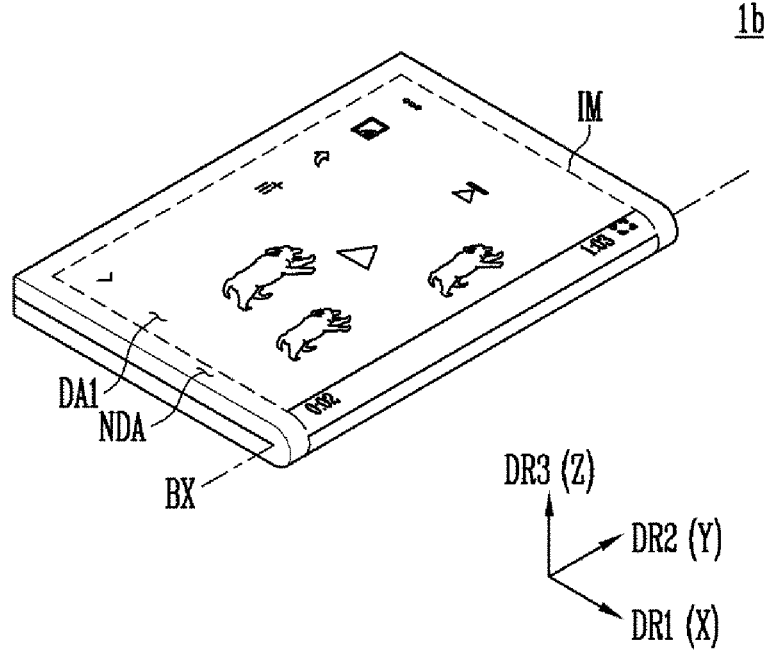

FIG. 1 is a perspective view of a display device according to some example embodiments of the present invention. FIGS. 2 and 3 are perspective views showing a folded state of a display device of FIG. 1.

Referring to FIGS. 1 to 3, a display device 1 according to some example embodiments of the present invention includes a display surface IS for displaying an image. The display surface IS on which the image IM is displayed is parallel to a surface defined by a first direction DR1 and a second direction DR2. A third direction DR3 indicates a normal direction of the display surface IS, that is, a thickness direction of the display device 1.

In this specification, a vertical direction of display device 1 is defined as the first direction DR1 and a direction crossing the first direction DR1 is defined as the second direction DR2 for better understanding and ease of description. That is, the second direction DR2 may indicate a horizontal direction of the display device 1. A thickness direction of the display device 1, that is, a direction crossing both the first direction DR1 and the second direction DR2 is defined as the third direction DR3. However, the example embodiments are not limited to the aforementioned direction, and it should be understood that the first direction DR1, the second direction DR2, and the third direction DR3 refer to relative directions crossing each other. In addition, the first direction DR1, the second direction DR2 and the third direction DR3 may define an X-axis, a Y-axis and a Z-axis, respectively, and may also be referred to as an X-axis direction, a Y-axis direction and a Z-axis direction.

According to some example embodiments, the display device 1 may be bent. For example, the display device 1 may be a foldable display device or a rollable display device. However, the example embodiments are not limited thereto, and a rigid display device may be applied.

According to some example embodiments, the display device 1 may be used as a large electronic device such as a television, a monitor, and the like, or a small electronic device such as a portable phone, a tablet, a car navigation device, a game device, a smart watch, and the like.

According to some example embodiments, the display surface IS of the display device 1 may include a plurality of areas. The display surface IS of the display device 1 may include a display area DA on which the image IM is displayed and a non-display area NDA adjacent to the display area DA. The non-display area NDA may be an area at which the image is not displayed. FIGS. 1 and 3 show a state in which a video reproducing application is executed on the display device 1 as an example of the image IM.

The display area DA may be a quadrangle shape. The non-display area NDA may be a shape surrounding the display area DA. However, the present invention is not limited thereto, and a shape of the display area DA and a shape of the non-display area NDA may be relatively changed.

According to some example embodiments, the display device 1 may include a housing. The housing may be located at an outside of the display device 1 and may accommodate components therein.

According to some example embodiments, the display device 1 may be bent with respect to a bending axis BX. For example, the bending axis BX may cross the display area DA.

As shown in FIG. 2, the display device 1 may be in an in-folding state 1a. When the display device 1 according to some example embodiments of the present invention is in-folded with respect to the bending axis BX, the display surface IS of the display device 1 may be folded with respect to the bending axis BX, the display surface IS of the display device 1, which is divided by the bending axis BX, may be folded to face each other, and a back surface opposite to the display surface IS may be exposed to the outside.

As shown in FIG. 3, the display device 1 according to some example embodiments of the present invention may be in an out-folding state 1b. When the display device according to some example embodiments of the present invention is out-folded with respect to the bending axis BX, the display surface IS of the display device 1 may be exposed to the outside, a back surface opposite to the display surface IS may be folded with respect to the bending axis BX, and both sides of the back surface which is divided by the bending axis BX may be folded to face each other.

The display device 1 may be folded or rolled in various ways in addition to being in-folded or out-folded with respect to the bending axis BX.

Meanwhile, the display area DA of the display device 1 may include a plurality of areas driven at different frequencies. According to some example embodiments, the display device 1 may include a first display area DA1 and a second display area DA2 divided with respect to a bending axis BX. According to some example embodiments, the first display area DA1 and the second display area DA2 may be in contact with each other with the bending axis BX interposed therebetween.

The second display area DA2 may not be visible due to a position where the user looks at the display device when the display device is in the out-folding state. In this case, the second display area DA2 may be driven at a lower frequency than the first display area DA1. Accordingly, the display device 1 may reduce power consumption than when both the first display area DA1 and the second display area DA2 are driven at the same frequency as the first display area DA1.

For example, the first display area DA1 may be driven at a first frequency of 60 Hz to 250 Hz, and the second display area DA2 may be driven at a second frequency of 1 Hz to 30 Hz. According to some example embodiments, only the first display area DA1 may be driven while the second display area DA2 turns off the image IM.

Figure 4:
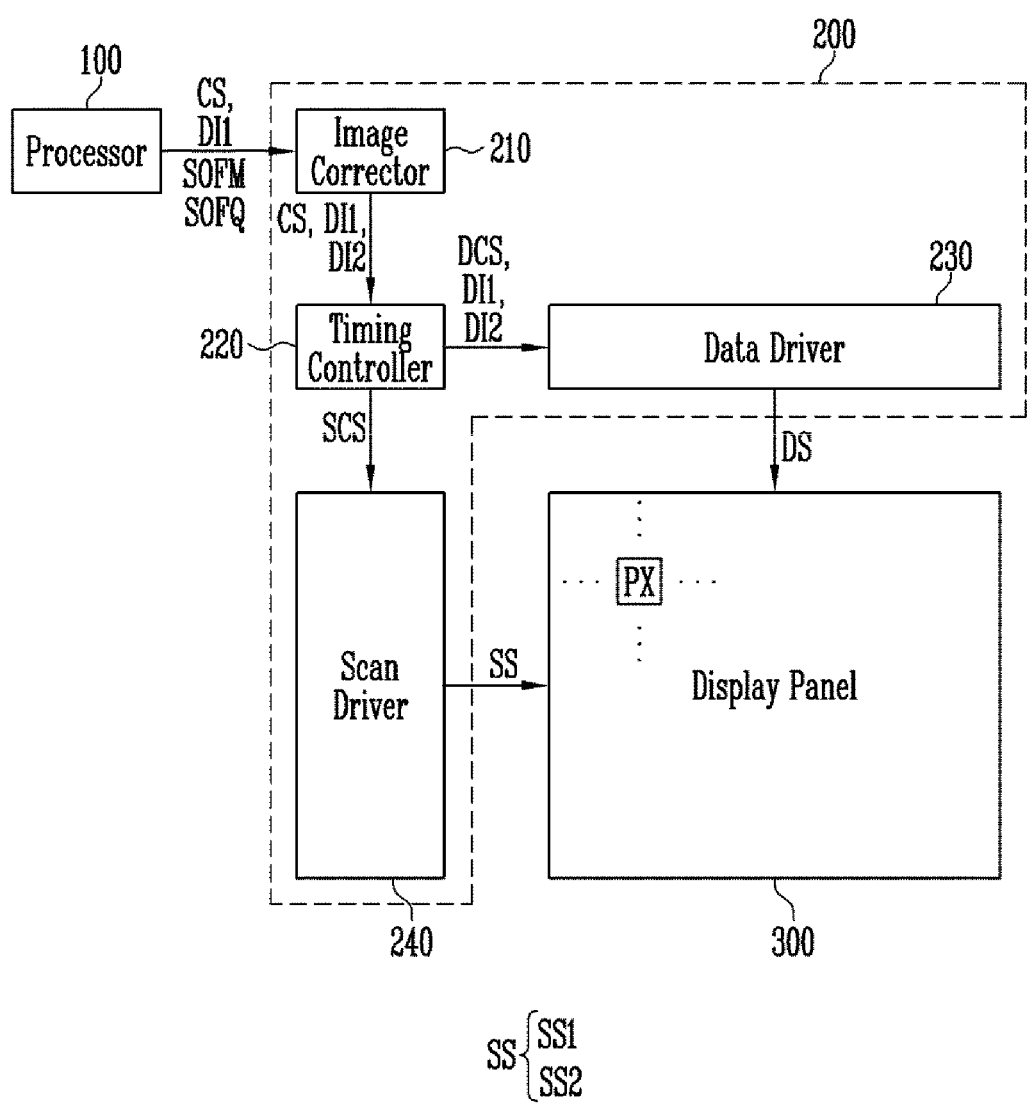
FIG. 4 is a schematic block diagram of a display device according to some example embodiments of the present invention.

FIG. 4 is a schematic block diagram of a display device according to some example embodiments of the present invention.

Referring to FIG. 4, the display device 1 according to some example embodiments of the present invention may include a processor 100, a display driver 200, and a display panel 300.

The display panel 300 may include pixels PX displaying an image (e.g., a set or predetermined image). Each pixel PX may define a light emitting area that emits a color (e.g., a set or predetermined color). For example, a plurality of pixels PX may define a plurality of light emitting areas that emit red, green, and blue light. The display area DA may include the plurality of light emitting areas and a non-light emitting area that divides each of the light emitting areas. According to some example embodiments, the pixels PXs may be arranged in row direction and column direction in a matrix form or configuration. Similarly, a plurality of light emitting areas defined by the pixels PX may be arranged in a row direction and a column direction in a matrix form or configuration, and a position of each pixel PX may correspond to a position of each light emitting area.

The processor 100 may supply a first image data DI1 and a control signal CS to the display driver 200. For example, the control signal CS may include a vertical synchronization signal Vsync, a horizontal synchronization signal, a data enable signal, a clock signal, and the like. According to some example embodiments, the processor 100 may further supply scan-off frame information SOFM and scan-off frequency information SOFQ to the display driver 200.

For example, the processor 100 may be implemented as a processor capable of controlling an operation of an integrated circuit (IC), an application processor AP, a mobile AP, or the display driver 200.

The display driver 200 may include an image corrector 210, a timing controller 220, a scan driver 240, and a data driver 230.

The image corrector 210 may generate a second image data DI2 using the first image data DI1 and the control signal CS supplied from the processor 100. In addition, the image corrector 210 may transfer the first image data DI1, the second image data DI2, and the control signal CS to the timing controller 220. Here, the second image data DI2 refers to image data obtained by moving the first image data DI1 using an image movement (pixel shift) technique.

According to some example embodiments, the image corrector 210 may directly supply the first image data DI1, the second image data DI2 and the control signal CS to the data driver 230 without using the timing controller 220.

According to some example embodiments, the image corrector 210 may be located separately from the display driver 200.

According to some example embodiments, the image corrector 210 may be integrated into timing controller 220, and the timing controller 220 may convert the first image data DI1 to the second image data DI2.

The timing controller 220 may receive the first image data DI1, the second image data DI2 and the control signal CS from the image corrector 210.

The timing controller 220 may generate a timing control signal for controlling the scan driver 240 and the data driver 230 based on the control signal CS.

For example, the timing control signal may include a scan timing control signal SCS for controlling the scan driver 240 and a data timing control signal DCS for controlling the data driver 230. The timing controller 220 may supply the scan timing control signal SCS to the scan driver 240 and the data timing control signal DCS to the data driver 230.

The timing controller 220 may display the first image by supplying the first image data DI1 to the data driver 230 during the first period, and display the second image by supplying the second image data DI2 to the data driver 230 during the second period.

The data driver 230 may generate a data signal DS by receiving the data timing control signal DCS, and the first and second image data DI1 and DI2 from the timing controller 220.

In addition, the data driver 230 may supply the generated data signal DS to data lines.

The data driver 230 may be electrically connected to the data lines located in the display panel 300 through separate constituent elements.

According to some example embodiments, the data driver 230 may be directly mounted on the display panel 300.

The scan driver 240 supplies scan signals SS to the scan lines in response to the scan timing control signal SCS. The scan driver 240 may be electrically connected to the scan lines located in the display panel 300. The pixel circuit constituting each pixel PX may be connected to at least one scan line and at least one data line. According to some example embodiments, the scan driver 240 may supply the first scan signal SS1 with the first frequency to the pixels PX located in the first display area, and may supply the second scan signal SS2 with the second frequency to the pixels PX located in the second display area.

According to some example embodiments, the scan driver 240 may be directly mounted on the display panel 300.

The pixels PX of the display panel 300 receiving the data signal DS through the data lines may emit light with luminance corresponding to the data signal DS when the scan signal SS is supplied.

For example, when the timing controller 220 or the image corrector 210 supplies the first image data DI1, the data driver 230 may display the first image by supplying a data signal DS corresponding to the first image data DI1 to the pixels PX.

In addition, when the timing controller 220 or the image corrector 210 supplies the second image data DI2, the data driver 230 may display the second image by supplying a data signal DS corresponding to the second image data DI2 to the pixels PX.

The data driver 230 may be located separately from the scan driver 240.

The display panel 300 may display an image according to a control of the display driver 200 which supplies the scan signal SS and the data signal DS.

For example, the display panel 300 may be implemented as organic light emitting display panel, a liquid crystal display panel, a plasma display panel, and the like, but is not limited thereto.

Figure 5:
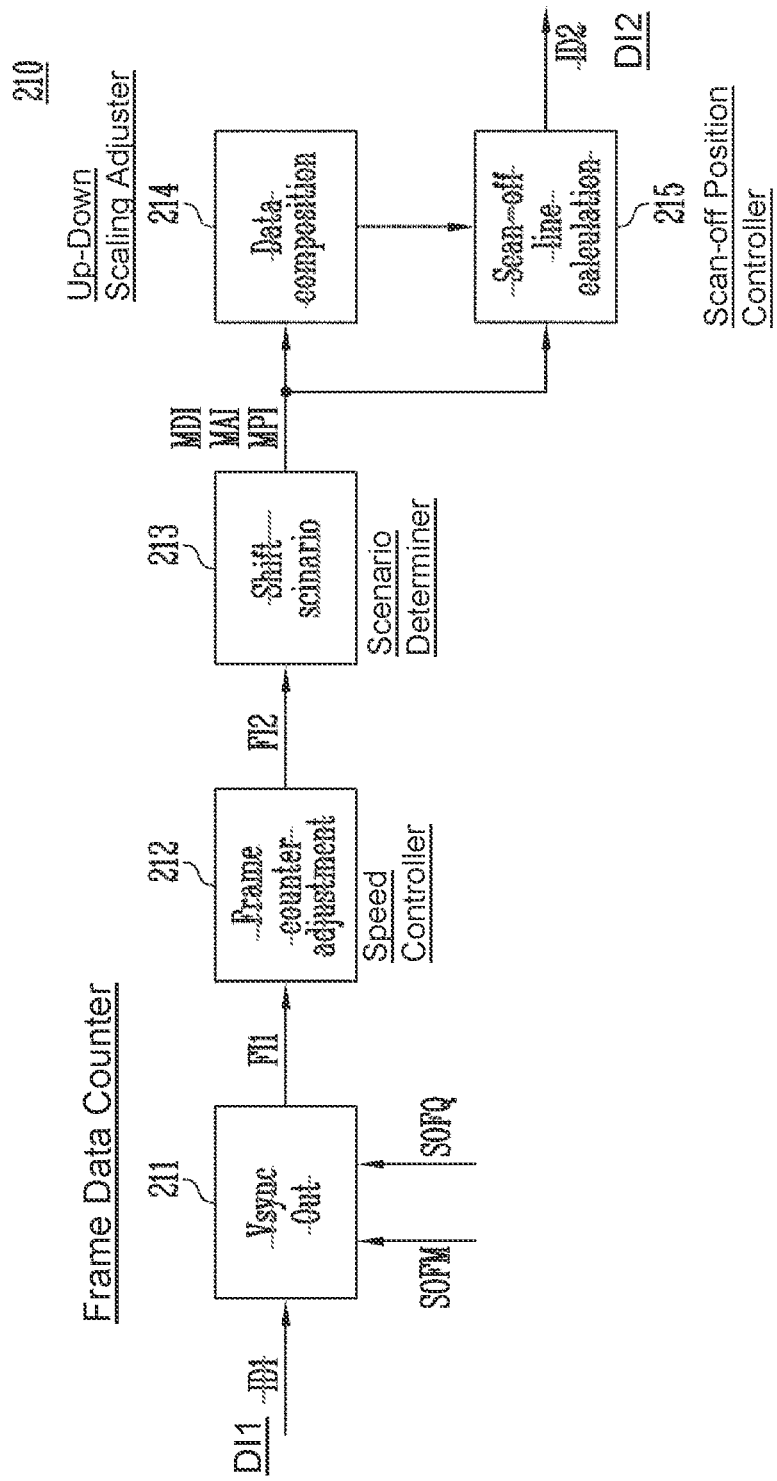
FIG. 5 is a schematic block diagram of an image corrector according to some example embodiments of the present invention.
Figure 6:
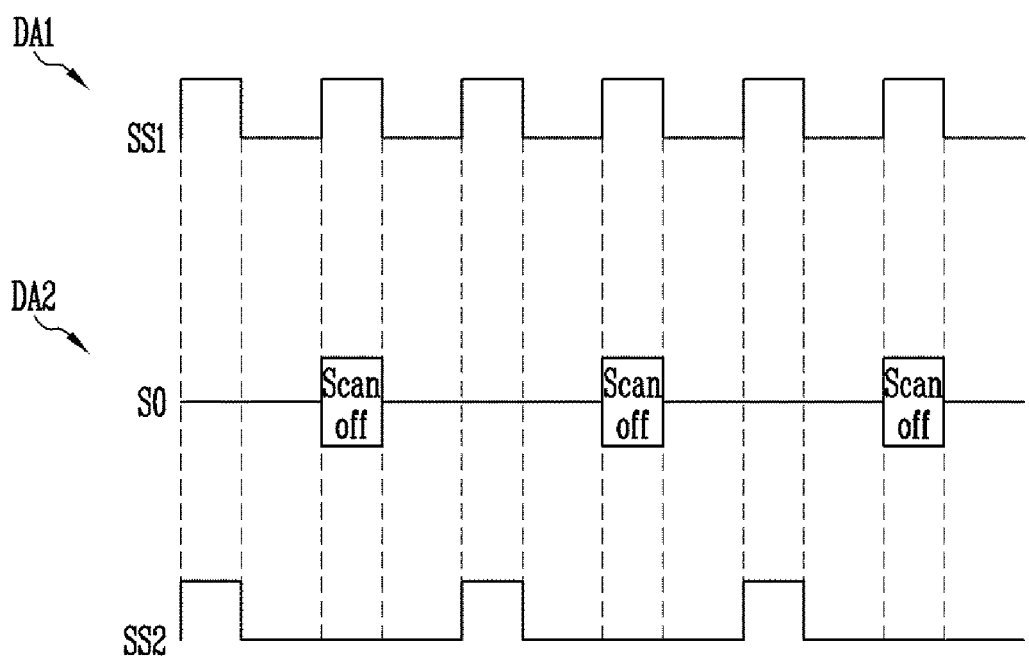
FIG. 6 is a drawing showing a concept of converting a high frequency signal to a low frequency signal.
Figure 7:
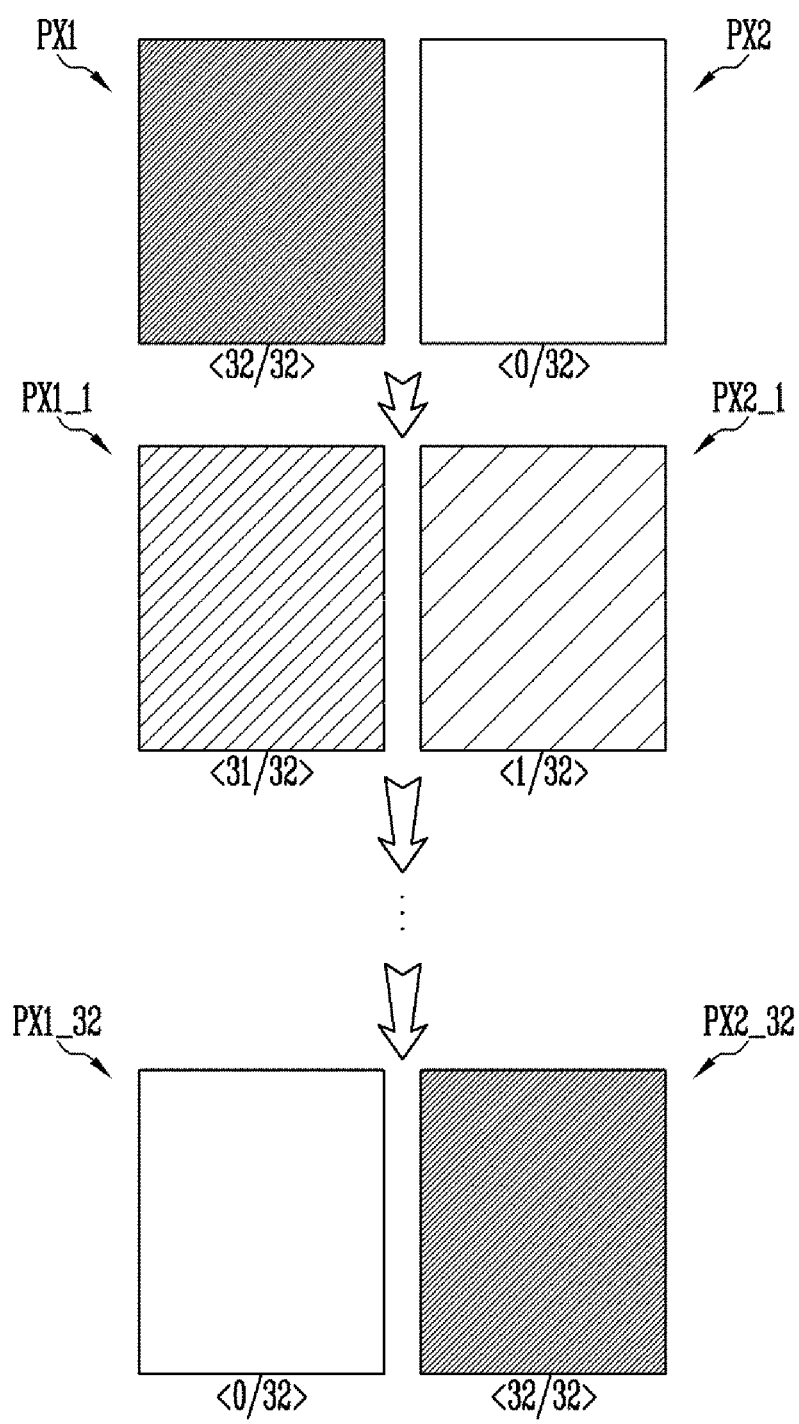
FIG. 7 is a drawing showing a concept of an image movement between adjacent pixels.
Figure 8:
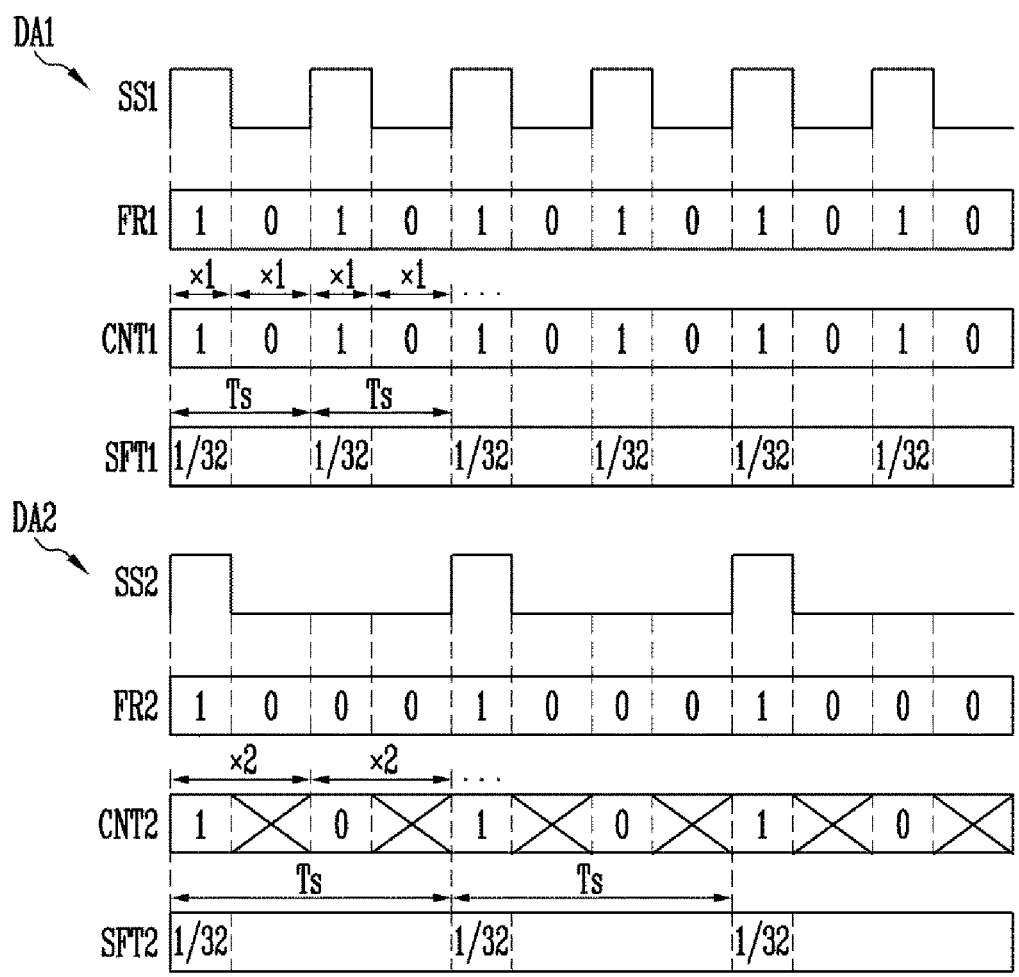
FIG. 8 is a drawing showing a concept of a speed control for image movements of display areas driven at different frequencies.
Figure 9:
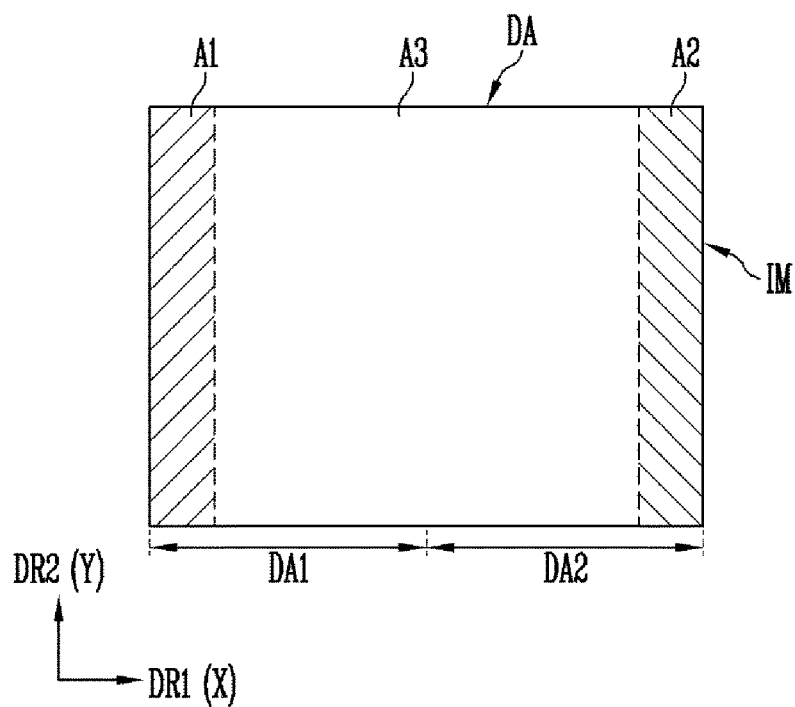
FIGS. 9 and 10 are conceptual views showing an image movement in an X-axis direction of a display device according to some example embodiments of the present invention.
Figure 10:
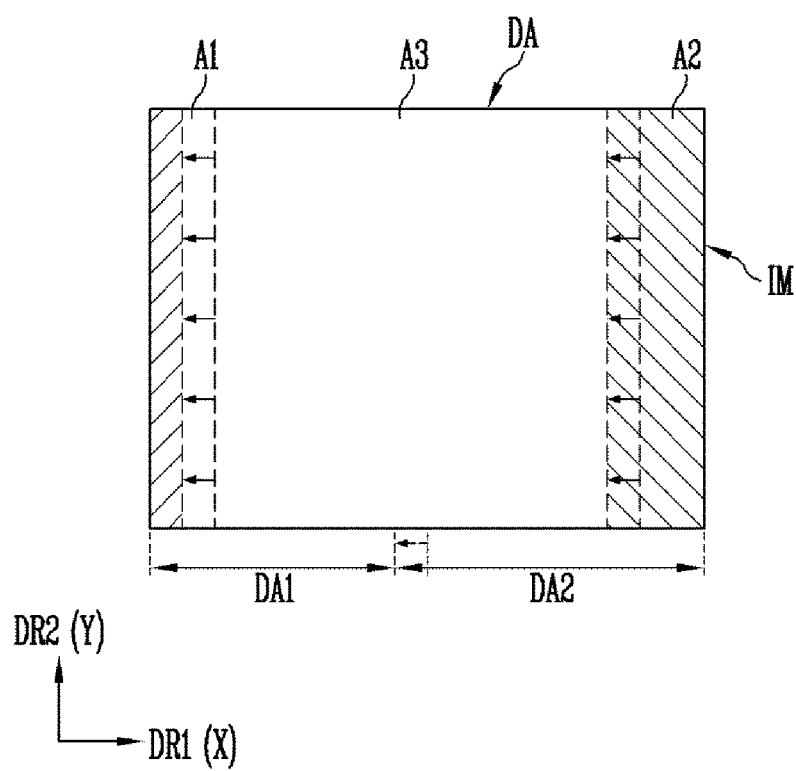

FIG. 5 is a schematic block diagram of an image corrector according to some example embodiments of the present invention. FIG. 6 is a drawing showing a concept of converting a high frequency signal to a low frequency signal. FIG. 7 is a drawing showing a concept of an image movement between adjacent pixels. FIG. 8 is a drawing showing a concept of a speed control for image movements of display areas driven at different frequencies. FIGS. 9 and 10 are conceptual views showing an image movement in an X-axis direction of a display device according to some example embodiments of the present invention.

Referring to FIG. 5, the image corrector 210 may include a frame data counter 211, a speed controller 212, a scenario determiner 213, an up-down scaling adjuster 214, and a scan-off position controller 215.

The frame data counter 211 may calculate frame information CI of the image IM provided to the display area DA. At this time, the frame data counter 211 may calculate how many frames the first image data DI1 currently supplied corresponds to by using a control signal CS such as a vertical synchronization signal supplied from the processor 100.

Because the display device is respectively driven at the first and second frequency different from each other in the first display area DA1 and the second display area DA2, the frame information of the first display area DA1 and the frame information of the second display area DA2, which are calculated by the frame data counter 211, may be configured separately.

On the other hand, the second scan signal SS2 which is a relatively low frequency may be generated using a signal having the same frame and frequency as the first scan signal SS1. Hereinafter, the first frequency is described as 60 Hz and the second frequency is described as 30 Hz, but a frequency is not limited thereto.

For example, referring to FIG. 6 together, a scan-off signal SO may be used to convert the first scan signal SS1 to the second scan signal SS2. The scan-off signal SO includes scan-off frame information SOFM and scan-off frequency information SOFQ.

In FIG. 6, it is assumed that a frame having a high logic level is a scan-on frame and a frame having a low logic level is a scan-off frame.

The second scan signal SS2 may be generated by applying the scan-off signal SO in some periods of the first scan signal SS1 having a relatively high frequency. Applying the scan-off signal SO may refer to turn off a specific scan-on frame of the scan signal. For example, the scan-off signal SO that turns off an even numbered scan-on frame may be applied to the first scan signal SS1 of 60 Hz to generate the second scan signal SS2 of 30 Hz. The scan-off signal SO may be generated by the scan-off frame information SOFM and the scan-off frequency information SOFQ described above.

The frame data counter 211 may store a position of the scan-on frame that is turned off to generate the second scan signal SS2 through the supplied scan-off frame information SOFM and scan-off frequency information SOFQ.

In addition, the frame data counter 211 may calculate first frame information FI1 including frame information of the first display area DA1 to which the first scan signal SS1 is provided and frame information of the first display area DA1 to which the second scan signal SS2 is provided through the vertical synchronization signal, and may provide the calculated frame information FI1 to the speed controller 212.

The speed controller 212 may receive the first frame information FI1 to control a moving speed of the image IM of each display area DA1 and DA2 driven at different frequencies.

Referring to FIG. 7 together, according to some example embodiments, an image movement may be performed by controlling a light emitting amount between adjacent pixels PX. It is assumed that the image is moved from the adjacent first pixel PX1 to the second pixel PX2 in FIG. 7.

According to some example embodiments, the image movement may be performed by lowering the light emitting amount of the first pixel PX1 by a ratio (e.g., a set or predetermined ratio) and increasing the light emitting amount of the second pixel PX2 by a ratio (e.g., a set or predetermined ratio). For example, when the first pixel PX1 has an initial light emitting amount with a ratio of 1 (i.e., 32/32) and the second pixel PX2 has an initial light emitting amount with a ratio of 0 (i.e., 0/32), the light emitting amount of the first pixel PX1 may be reduced by 1/32, and the light emitting amount of the second pixel PX2 may be increased by 1/32 per frame. The first pixel PX1 may have the light emitting amount of 31/32 (see PX1_1), and the second pixel PX2 may have the light emitting amount of 1/32 (see PX2_1) with respect to each initial light emitting amount during a first frame. As the 32-th frame passes, the first pixel PX1 may have the light emitting amount of 0 (i.e., 0/32) (see PX1_32) and the second pixel PX2 may have the light emitting amount of 1 (i.e., 32/32) (see PX2_32) with respect to each initial light emitting amount. Therefore, the image IM displayed by the first pixel PX1 may be transferred to the second pixel PX2.

On the other hand, assuming that there is no separate device that controls the image moving speed, the time taken to complete the image movement from the first pixel PX1 to the second pixel PX2 when driven at the second frequency (e.g., 30 Hz), may be twice as long as the time taken when the driven at the first frequency (e.g., 60 Hz). That is, the image movement of each pixels PX of the first display area DA1 and the second display area DA2 may be completed at different times, thereby allowing the user to see a separated screen.

The display device of the present invention may include the speed controller 212 so that the times at which image movement of all display areas DA1 and DA2 is completed are the same even with a plurality of display areas DA driven at different frequencies.

The speed controller 212 may adjust the moving speed of the images of each display area DA1 and DA2 by counting a frame of the image IM. The frame of the image IM may determine with respect to the scan signal SS supplied to the pixel PX of each display area DA1 and DA2.

Referring to FIG. 8 together, the first scan signal SS1 applied to the pixel PX of the first display area DA1 may be numbered "101010101010 . . . " in a frame order when the scan-on frame is numbered to '1' and the scan-off frame is numbered to '0' in the scan signal. This is referred to as a first frame counting FR1. The second scan signal SS2 applied to the pixel PX of the second display area DA2 may be numbered "100010001000 . . . " in a frame order, corresponding to the first scan signal SS1. This is referred to as a second frame counting FR2.

The speed controller 212 may increase a speed of a frame counting in a target display area (e.g. DA2) driven at a lower frequency with respect to the scan signal (e.g. SS1) of the display area (e.g. DA1) driven at the highest frequency. That is, the following [Equation 1] may be applied to the speed of the frame counting in the target display area.

A speed of the frame counting in the target display area=a speed of the frame counting in the display area driven at the highest frequency×(driving frequency in the display area driven at the highest frequency/driving frequency in the target display area) [Equation 1]

For example, assuming that the first display area DA1 driven at 60 Hz is the display area driven at the highest frequency and the speed of the frame counting in the first display area DA1 is 1 (ratio value) (see CNT1), the speed of the frame counting in the second display area DA2 driven at 30 Hz may be 2 (ratio value) (see CNT2).

The first frame counting FR1, 101010101010 . . . , may be counted at a speed of 1 (ratio value) for each frame (see CNT1), and the second frame counting FR2, 100010001000 . . . , may be counted at a speed of 2 (ratio value) for each frame (see CNT2). Accordingly, a cycle Ts at which each counting number becomes '1' may be the same in the first frame counting FR1 and the second frame counting FR2.

The image movement may be performed in the first display area DA1 and second display area DA2 when a numbering of the frame counting FR1 and FR2 of the scan signal SS1 and SS2 becomes '1' respectively, and the image movement may be performed at the same time in each display area DA1 and DA2 (see SFT1, SFT2). That is, the light emitting amount of each of the first display area DA1 and the second display area DA2 may be adjusted by a ratio (e.g., a set or predetermined ratio) (e.g., ratio of 1/32 of the initial light emitting amount) between adjacent pixels (e.g., PX1 and PX2 in FIG. 7) with the same cycle Ts at the same time (see SFT1 and SFT2).

The speed controller 212 may calculate the second frame information FI2 including the frame information of each display area DA1 and DA2 and the speed of the frame counting FR1 and FR2, and may provide the calculated second frame information FI2 to the scenario determiner 213.

The scenario determiner 213 may determine the moving direction and moving amount of the image IM. In more detail, the scenario determiner 213 may determine an X-axis moving direction, a Y-axis moving direction, an X-axis moving amount and a Y-axis moving amount.

The scenario determiner 213 may generate image moving direction information MDI including information on a moving direction of the determined image IM. In addition, the scenario determiner 213 may generate image moving amount information MAI including information on a moving amount of the determined image IM. Furthermore, the scenario determiner 213 may generate image movement pattern information MPI including information on a movement pattern of the determined image IM.

For example, the scenario determiner 213 may determine the X-axis moving direction, the Y-axis moving direction, the X-axis moving amount, the Y-axis moving amount, and the movement pattern corresponding to the second frame information FI2 from the second frame information FI2.

According to some example embodiments, the scenario determiner 213 may generate a lookup table that includes information on the moving direction, the moving amount, and the moving pattern of the image IM, and may determine the moving direction, the moving amount, and the moving pattern of the image IM by using the generated lookup table.

According to some example embodiments, the scenario determiner 213 may determine the moving direction, the moving amount, and the moving pattern of the image IM by using a lookup table transferred from the outside or stored in advance.

The scenario determiner 213 may determine an X-axis area by using the image moving direction information MDI, the image moving amount information MAI, and the image moving pattern information MPI in the X-axis direction, and may generate X-axis area information XAI on the determined X-axis area. The X-axis area may include an X-axis reducing area, an X-axis expanding area and an X-axis moving area.

The scenario determiner 213 may determine a Y-axis area by using the image moving direction information MDI, the image moving amount information MAI, and the image moving pattern information MPI in the Y-axis direction, and may generate Y-axis area information YAI on the determined Y-axis area. The Y-axis area may include a Y-axis reducing area, a Y-axis expanding area, and a Y-axis moving area.

The up-down scaling adjuster 214 may adjust an up-down scaling in an edge portion of the display area DA by using the image moving direction information MDI, the image moving amount information MAI, and the image moving pattern information MPI. This will be described later with reference to FIGS. 9 to 11.

The scan-off position controller 215 may adjust a position of the scan-off signal SO by using the image moving direction information MDI, the image moving amount information MAI, the image moving pattern information MPI, and the up-down scaling information. By moving the image in the display area DA and adjusting a position of the scan-off signal SO simultaneously, it is possible to drive at a frequency (e.g., a set or predetermined frequency) in the first display area DA1 and the second display area DA2. The scan-off position controller 215 may adjust a position of the scan-off signal SO and generate a second image IM data ID2.

Hereinafter, the movement of the image IM will be described. The moving of the image IM in the X-axis direction will be described as an example. However, the following description may be applied to an example embodiment moving in the Y-axis direction.

FIGS. 9 and 10 are conceptual views showing an image movement in an X-axis direction of a display device according to some example embodiments of the present invention.

Referring to FIGS. 9 and 10, the display device 1 may display the image IM in the display area DA for several frame periods. Here, a size of the image IM may be set equal to or smaller than a size of the display area DA.

The image IM may include a plurality of areas. In detail, the image IM may include a first area A1, a second area A2, and a third area A3. According to some example embodiments, the first area A1 may be formed over a portion of the first display area DA1, the second area A2 may be formed over a portion of the second display area DA2, and the third area A3 may be formed over both the first display area DA1 and the second display area DA2.

The first area A1, the third area A3 and the second area A2 may be sequentially arranged in the X-axis direction. In other words, when determining a order in the X-axis direction, the third area A3 may be an area located between the first area A1 and the second area A2. At a time of FIGS. 9 and 10, the first area A1 may be an area located on a left side of the third area A3, and the second area A2 may be an area located on a right side of the third area A3.

At a time of FIGS. 9 and 10, the X-axis direction may be defined as a direction indicated by any straight line extending from left to right. According to some example embodiments, the X-axis direction may be defined as a direction in which a row of each pixel PX located in the display area DA increase. Accordingly, the Y-axis direction may be defined as a direction indicated by any straight line extending from top to bottom at a time of FIGS. 9 and 10. According to some example embodiments, the Y-axis direction may be defined as a direction in which a row of each pixel PX located in the display area DA increases. The example embodiments are not limited to the terms of the X-axis direction and the Y-axis direction.

FIG. 9 schematically shows an image IM displayed in the display area DA during the first frame period, and FIG. 10 schematically shows an image IM displayed in the display area DA during the second frame period. The first frame period and the second frame period are referred to as a frame in which an image movement is completed. The second frame period may be continuous to the first frame period.

The image IM displayed during the first frame period may be displayed in a form moved in the opposite direction of the X-axis direction in the second frame period. In other words, the first area A1, the second area A2, and the third area A3 of the image IM displayed during the first frame period may be displayed in a form in which some areas are deformed in the second frame period.

For example, the first area A1 may be expanded in the opposite direction of the X-axis direction in the second frame period than the first frame period, and the second area A2 may be reduced in the opposite direction of the X-axis direction in the second frame period than the first frame period. The third area A3 may be moved in the opposite direction of the X-axis direction in the second frame period than in the first frame period. However, the entire area of the first area A1, the second area A2, and the third area A3 may remain the same in the first frame period and the second frame period.

As such, a generation of an after-image may be suppressed and a degradation of the display device 1 may be minimized by expanding, reducing and moving the image IM for each area.

The example embodiment shown in FIGS. 9 and 10 shows the movement in the opposite direction of the X-axis direction, but the movement in the X-axis direction may be also be possible. In this case, the first area A1 may be reduced in the X-axis direction, the second area A2 may be expanded in the X-axis direction, and the third area A3 may be moved in the X-axis direction.

Figure 11:
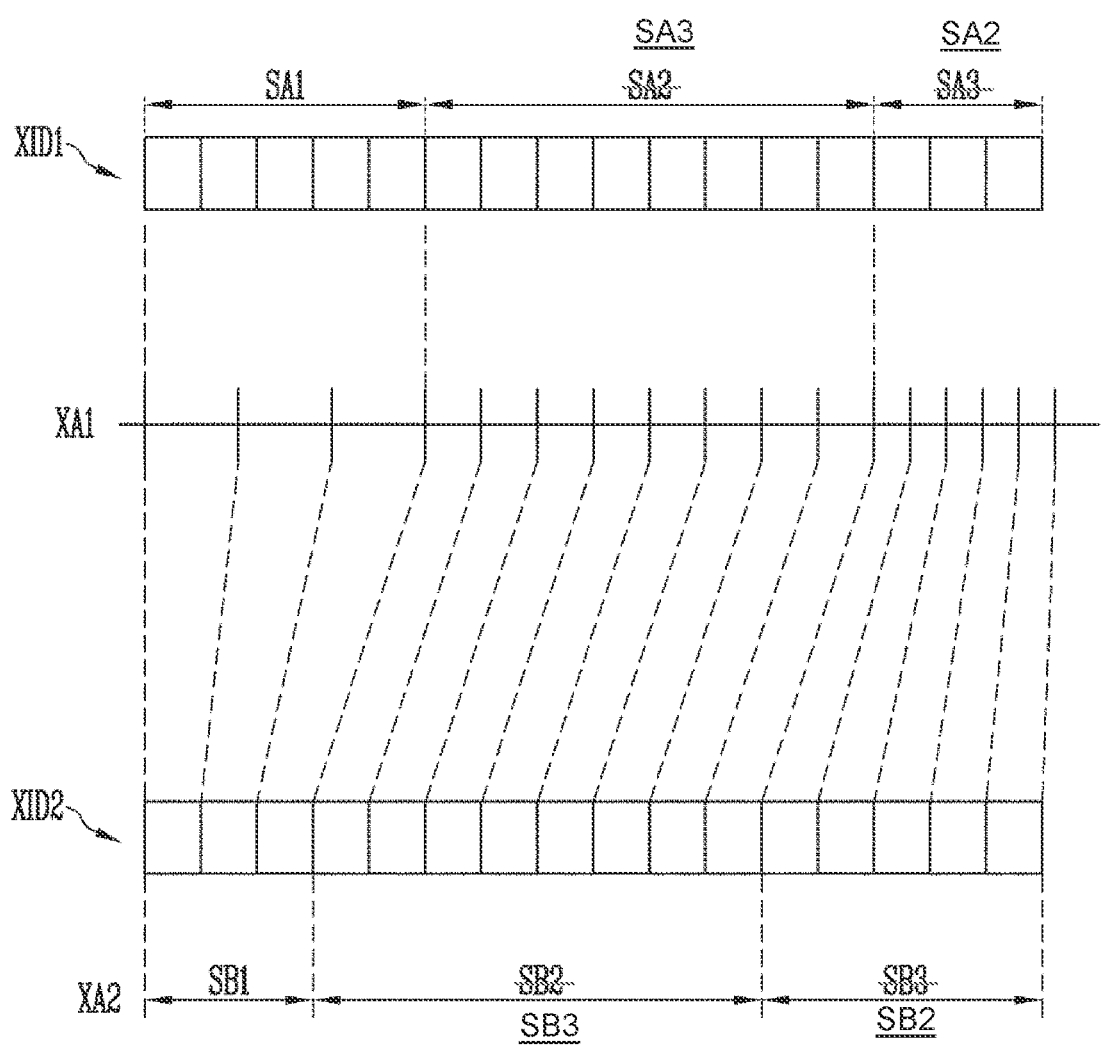
FIG. 11 is a conceptual view showing a method generating image data shifted in the X-axis direction of an image corrector according to some example embodiments of the present invention.

FIG. 11 is a conceptual view showing a method generating image data shifted in the X-axis direction of an image corrector according to some example embodiments of the present invention.

FIG. 11 shows a first X-axis image data XID1 and a second X-axis image data XID2 associated with one row of pixels PX among the pixels PX located in matrix form for better understanding and ease of description. Here, the first X-axis image data XID1 may correspond to a portion of the first image data ID1 described above, and the second X-axis image data XID2 may correspond to a portion of the second image data ID2 described above.

The X-axis area XA1 before moving may include sub-areas SA1, SA2, and SA3 before moving. In addition, the X-axis area XA2 after moving may include sub-areas SB1, SB2, and SB3 after moving corresponding to data after the image IM moves.

For example, an image IM displayed on the fifth pixel PX in a right direction from the leftmost pixel PX may be determined as the first area SA1 before moving, an image IM displayed on the third pixel PX in a left direction from the rightmost pixel PX may be determined as the second area SA2 before moving, and an image IM displayed on the pixel PX located between the first area SA1 before moving and the second area SA2 before moving may be determined as the third area SA3 before moving.

The up-down scaling adjuster 214 may convert the first X-axis image data XID1 displaying the sub-areas SA1, SA2, and SA3 before moving into the second X-axis image data XID2 so as to display the sub-areas SB1, SB2, and SB3 after moving.

For example, the up-down scaling adjuster 214 may convert the first X-axis image data XID1 displaying the first area SA1 before moving into the second X-axis image data XID2 so as to display the first area SB1 after moving.

In addition, the up-down scaling adjuster 214 may convert the first X-axis image data XID1 displaying the second area SA2 before moving into the second X-axis image data XID2 so as to display the second area SB2 after moving.

In addition, the up-down scaling adjuster 214 may convert the first X-axis image data XID1 displaying the third area SA3 before moving into the second X-axis image data XID2 so as to display the third area SB3 after moving.

Thereinafter, the reduction of the image IM will be described in more detail.

The up-down scaling adjuster 214 may determine the first area SB1 after moving reduced than the first area SA1 before moving by using the image moving direction information MDI and the image moving amount information MAI generated by the scenario determiner 213.

For example, when the image moving direction information MDI is set to the opposite direction of the X-axis direction, and the image moving amount information MAI is set to a movement of n pixel PX (n is a positive number), the up-down scaling adjuster 214 may set the first area SB1 after moving reduced than the first area SA1 before moving by the n pixels PX in the opposite direction of the X-axis direction.

Next, in order to reduce the image IM, the up-down scaling adjuster 214 may convert an image IM displayed on p pixels PX (p is a positive number) of the first area SA1 before moving into an image IM displayed on q pixels PX (q is a positive number less than p) of the first area SB1 after moving.

That is, the up-down scaling adjuster 214 may convert data to be provided to the p pixels PX into data to be provided to the q pixels PX.

Because the image IM displayed on the p pixels PX is displayed on the q pixels PX, the image IM displayed in the first area SB1 after moving may be reduced at a ratio of k (here k=q/p) to the image IM displayed in the first area SA1 before moving to be displayed.

Thereinafter, the expansion of the image IM will be described in more detail.

The up-down scaling adjuster 214 may determine the second area SB2 after moving expanded than the second area SA2 before moving by using the image moving direction information MDI and the image moving amount information MAI generated by the scenario determiner 213.

For example, when the image moving direction information MDI is set to the opposite direction of the X-axis direction, and the image moving amount information MAI is set to a movement of n pixels PX (n is a positive number), the up-down scaling adjuster 214 may set the second area SB2 after moving expanded than the second area SA2 before moving by the n pixels PX in the opposite direction of the X-axis direction.

Next, in order to expand the image IM, the up-down scaling adjuster 214 may convert an image IM displayed on r pixels PX (r is a positive number) of the second area SA2 before moving into an image IM displayed on s pixels PX (s is a positive number greater than r) of the second area SB2 after moving.

That is, the up-down scaling adjuster 214 may convert data to be provided to the r pixels PX into data to be provided to the s pixels PX.

Because the image IM displayed on the r pixels PX is displayed on the s pixels PX, the image IM displayed in the second area SB2 after moving may be expanded at a ratio of I (here I=s/r) to the image IM displayed in the second area SA2 before moving to be displayed.

Thereinafter, the movement of the image IM will be described in more detail.

The up-down scaling adjuster 214 may determine the third area SB3 after moving moved in the opposite direction of the X-axis direction than the third area SA3 before moving by using the image moving direction information MDI and the image moving amount information MAI generated by the scenario determiner 213.

For example, when the image moving direction information MDI is set to the opposite direction of the X-axis direction, and the image moving amount information MAI is set to a movement of n pixels PX (n is a positive number), the up-down scaling adjuster 214 may set the third area SB3 after moving moved than the third area SA3 before moving by the n pixels PX in the opposite direction of the X-axis direction.

Next, in order to move the image IM, the up-down scaling adjuster 214 may convert a position of an image IM displayed on t pixels PX (t is a positive number) of the third area SA3 before moving into a position of an image IM displayed on t pixels PX of the third area SB3 after moving A person of an ordinary skill in the art may be applied to a method of generating image data moved in the Y-axis direction by modifying the method described above.

Next, a display device according to some example embodiments will be described. Hereinafter, the description for the same constituent elements as FIGS. 1 to 11 is omitted and the same or similar reference numerals are used in FIGS. 12 to 14.

Figure 12:
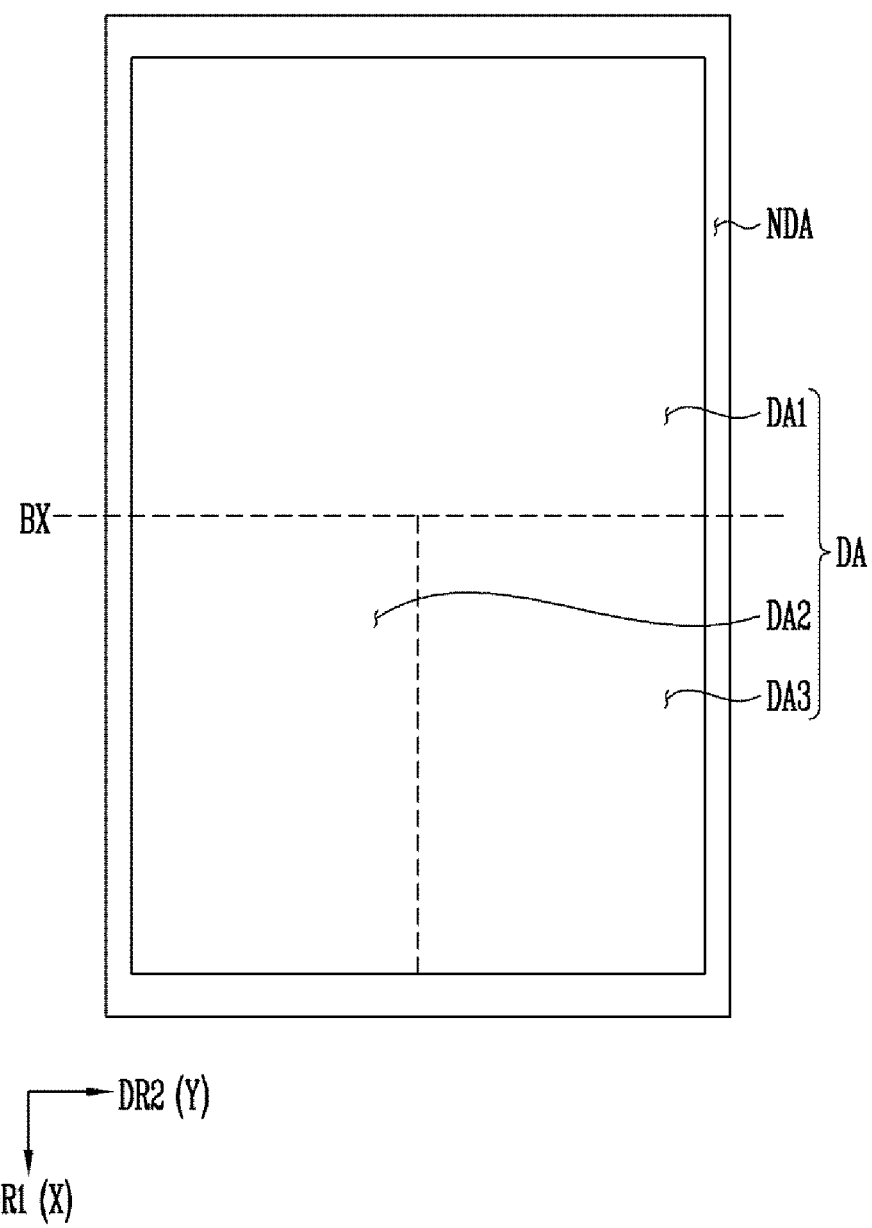
FIG. 12 is a top plan view of a display device according to some example embodiments of the present invention.

FIG. 12 is a top plan view of a display device according to some example embodiments of the present invention. FIG. 13 is a drawing showing a concept of converting a high-frequency signal to a low-frequency signal in a display device of FIG. 12. FIG. 14 is a drawing showing a concept of a speed control for image movements of display areas driven at different frequencies in a display device of FIG. 12.

Referring to FIGS. 12 to 14, a display device 2 according to some example embodiments of the present invention has a difference in that the display area DA further includes a third display area DA3 driven at a lower frequency than the second display area DA2 compared to the display device 1 according to some example embodiments of FIGS. 1, 6 and 8.

According to some example embodiments, the display device 2 may include a first display area DA1 driven at the highest frequency, a second display area DA2 driven at the middle frequency and a third display area DA3 driven at the lowest frequency. For example, the display device 2 may display a video in the first display area DA1, display an image representing a text moving in column or row units in the second display area DA2, and display a static image in the third display area DA3. may be. Hereinafter, the first display area DA1 is driven at a frequency of 60 Hz, the second display area DA2 is driven at a frequency of 30 Hz, and the third display area DA3 is driven at a frequency of 15 Hz, but the embodiments are not limited to the frequency described above.

A third scan signal SS3 with a frequency of 15 Hz may be supplied to the pixels located in the third display area DA3. The third scan signal SS3 may be generated by applying a scan-off signal SO_1 in some periods of the first scan signal SS1 having the highest frequency. For example, the third scan signal SS3 with a frequency of 15 Hz may be generated by applying the scan-off signal SO_1 that turns off the 4i-2-th, 4i-1-th, and 4i-th frames (here i is a positive number) to the first scan signal SS1 with a frequency of 60 Hz.

Similarly, the second scan signal SS2 may have a frequency of 30 Hz by applying a scan-off signal SO that turns off the 2i-th frame to the first scan signal SS1.

A screen movement may be performed simultaneously in the first display area DA1, the second display area DA2 and the third display area DA3.

For example, when the first frame counting FR1 of the first scan signal SS1 applied to a pixel of the first display area DA1 is 101010101010 . . . , and the second frame counting FR2 of the second scan signal SS2 applied to a pixel of the second display area DA2 is 100010001000 . . . , the third frame counting FR3 of the third scan signal SS3 applied to a pixel of the third display area DA3 may be 100000001000 . . . .

The speed controller 212 may increase a speed of a frame counting in a target display area (e.g. DA2 and DA2) driven at a lower frequency with respect to the scan signal (e.g. SS1) of the display area (e.g. DA1) driven at the highest frequency.

For example, assuming that the first display area DA1 driven at 60 Hz is the display area DA driven at the highest frequency and the speed of the frame counting in the first display area DA1 is 1 (ratio value) (see CNT1), the speed of the frame counting in the second display area DA2 driven at 30 Hz may be 2 (ratio value) (see CNT2) and the speed of the frame counting in the third display area DA3 driven at 15 Hz may be 4 (ratio value) (see CNT3).

The first frame counting FR1, 101010101010 . . . , may be counted at a speed of 1 (ratio value) for each frame (see CNT1), and the second frame counting FR2, 100010001000 . . . may be counted at a speed of 2 (ratio value) for each frame (See CNT2), and the third frame counting FR3, 100000001000 . . . , may be counted at a speed of 4 (ratio value) for each frame (see CNT3). Accordingly, a cycle Ts at which each counting number becomes '1' may be the same in the first frame counting FR1, the second frame counting FR2 and the third frame counting FR3.

The image movement may be performed in the first display area DA1, the second display area DA2, and the third display area DA3 when a numbering of the frame counting of the scan signal becomes '1' respectively, and the image movement may be performed at the same time in each display area DA1, DA2, and DA3 (see SFT1, SFT2, SFT3). That is, the light emitting amount of each of the first display area DA1, the second display area DA2, the third display area DA3 may be adjusted by a ratio (e.g., a set or predetermined ratio) (e.g., ratio of 1/32 of the initial light emitting amount) between adjacent pixels (e.g., PX1 and PX2 in FIG. 7) with the same cycle Ts at the same time (see SFT1, SFT2, SFT3).

According to some example embodiments described above, the display area DA is driven by being divided into various areas driven at various frequencies. However, the display area DA may convert the frequency in each area to be driven, and the idea of the present invention may be applied when a screen is moved.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present invention.

While aspects of some example embodiments of the invention are described with reference to the attached drawings, those with ordinary skill in the technical field of the present invention pertains will be understood that the present invention may be carried out in other specific forms without changing the technical idea or essential features. Accordingly, the above-described example embodiments should be considered in descriptive sense only and not for purposes of limitation.

What is claimed is:
1. A display device comprising:
a frame data counter configured to calculate frame information of an image displayed in a display area;
a speed controller configured to determine a moving speed of the image; and
a scenario determiner configured to determine a moving direction and moving amount of the image, wherein:
the display area includes a first display area for driving the image with a first scan signal of a first frequency; and
a second display area for driving the image with a second scan signal of a second frequency lower than the first frequency,
wherein the display device is configured to perform a pixel shift operation at the first display area and the second display area based on the first frequency and the second frequency, respectively, and wherein the speed controller is configured to control the moving speed of the image in each of the first display area and the second display area to be the same with each other based on a speed of a first frame counting at the first display area and a speed of a second frame counting at the second display area.

2. The display device of claim 1, wherein:
the first frequency is 60 Hz to 250 Hz; and
the second frequency is 1 Hz to 30 Hz.

3. The display device of claim 1, wherein
the second scan signal is generated by applying a scan-off signal that turns off a scan-on signal of a specific frame from a signal of the first frequency.

4. The display device of claim 3, wherein:
the scan-off signal is generated by scan-off frame information and scan-off frequency information; and
the frame data counter receives the scan-off frame information, the scan-off frequency information, and a vertical synchronization signal from an external source.

5. The display device of claim 3, further comprising
a scan-off position controller configured to determine a moving direction and a moving amount of a scan-off signal according to the moving direction and the moving amount of the image.

6. The display device of claim 1, wherein
the speed controller is configured to count a frame of an image displayed in the first display area and count a frame of an image displayed in the second display area.

7. The display device of claim 6, wherein
a speed that counts the frame of the image displayed in the second display area is determined by: a frame speed of the image displayed in the first display area×(the first frequency/the second frequency).

8. The display device of claim 7, wherein
the display area further includes a third display area for driving the image with a third scan signal of a third frequency lower than the second frequency, and
a speed that counts a frame of an image displayed in the third display area is determined by: a frame speed of the image displayed in the first display area×(the first frequency/the third frequency).

9. The display device of claim 1, further includes
an up-down scaling adjuster configured to divide the image into a plurality of areas, to determine a first area of the plurality of areas as a reduced area, and to determine a second area of the plurality of areas as an extended area according to the moving direction.

10. The display device of claim 9, wherein
the up-down scaling adjuster is configured to downscale the image in the first area, and to upscale the image in the second area.

11. A display device in which a display area is defined and an image moves in the display area, the display device comprising:
a display panel that includes a plurality of pixels;
a driver that includes a timing controller configured to control the display panel; and
an image corrector configured to provide image data to the timing controller,
wherein the image corrector is configured to determine a moving speed, a moving direction, and a moving amount of the image, wherein:
the display area includes a first display area for driving the image with a first scan signal of a first frequency; and
a second display area for driving the image with a second scan signal of a second frequency lower than the first frequency,
wherein the display device is configured to perform a pixel shift operation at the first display area and the second display area based on the first frequency and the second frequency, respectively, and
wherein the image corrector is configured to control the moving speed of the image in each of the first display area and the second display area to be the same with each other based on a speed of a first frame counting at the first display area and a speed of a second frame counting at the second display area.

12. The display device of claim 11, wherein
the plurality of pixels includes a first pixel and a second pixel adjacent to each other, and
the image corrector is configured to move the image by reducing in a frame unit by a certain ratio of a light emitting amount of the first pixel and increasing in a frame unit by the certain ratio of a light emitting amount of the second pixel.

13. The display device of claim 12, wherein:
the certain ratio is 1/32 of a light emitting amount of a previous frame.

14. The display device of claim 11, wherein
the display device bends with respect to a bending axis.

15. The display device of claim 14, wherein
the bending axis crosses the display area, and
the first display area and the second display area are divided by the bending axis.

16. The display device of claim 11, wherein
the moving speed is calculated by counting a frame of an image displayed in the display area,
the display area includes a plurality of areas driven at different frequencies,
the moving speed is calculated by counting a frame of an image displayed in the areas, and
a speed that counts a frame of an image of each of the areas is different from each other.

17. The display device of claim 16, wherein
a speed that counts the frame in a target area of the plurality of areas is determined by: a frame counting speed in an area driven at a highest frequency×(a drive frequency in a display area driven at a highest frequency/a drive frequency in a target display area).

* * * * *